L. VESTAL.
WEED PULLER.
APPLICATION FILED JUNE 23, 1920.
1,411,316.
Patented Apr. 4, 1922.
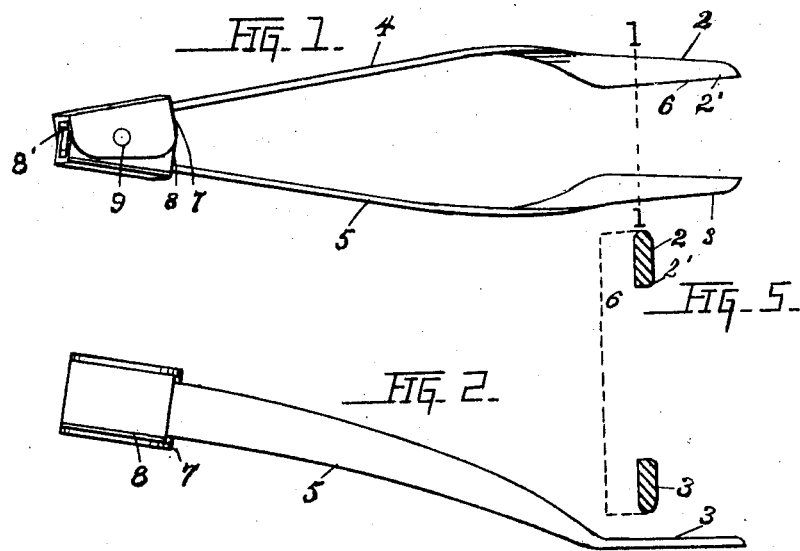
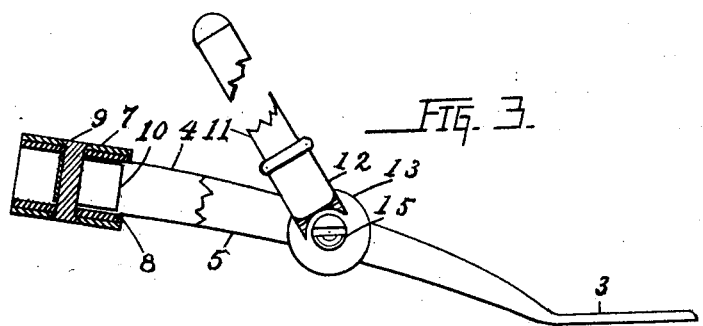
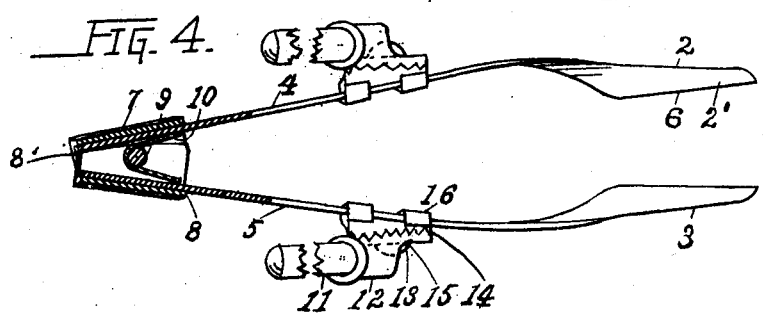
INVENTOR
Luther Vestal.
BY
George W. Hinton
ATTORNEY

UNITED STATES PATENT OFFICE.

LUTHER VESTAL, OF DEARBORN, MISSOURI, ASSIGNOR OF ONE-HALF TO NORMAN J. HUDSON, OF BUCHANAN COUNTY, NEAR DEARBORN, MISSOURI.

WEED PULLER.

1,411,316.  Specification of Letters Patent.  Patented Apr. 4, 1922.

Application filed June 23, 1920. Serial No. 390,999.

*To all whom it may concern:*

Be it known that I, LUTHER VESTAL, a citizen of the United States, residing at Dearborn, in the county of Platte and State of Missouri, have invented certain new and useful Improvements in Weed Pullers, of which the following is a specification, reference being had therein to the accompanying drawing.

My invention relates to improvements in weed pullers, and the objects of my improvements are, first; to provide a neat appearing instrument of this class, by the use of which, weeds, together with their roots, can easily and quickly be pulled from the ground, from among useful plants, without injuring the latter and without soiling the hands, second, to so construct a weed puller that it shall be easy of operation and light of weight, thereby enabling the operator to continually use the instrument, through an extended period of time, without tiring his hand, third, to so construct the parts of a weed puller, that they shall be simple, substantial, and cheap in cost of manufacture.

I attain these objects by the mechanism illustrated in the accompanying drawings, in which:

Figure 1 is a top view of the weed puller. Fig. 2 is a side view of the parts seen in Fig. 1. Fig. 3 is a view, similar to Fig. 2, with handles attached to the weed puller, certain parts being broken away. Fig. 4 is a top view of the parts seen in Fig. 3, certain parts being broken away. Fig. 5 is an enlarged vertical section, in detail, of the pulling members, on the line 1 1, looking toward the right.

Referring to Fig. 1, the weed pulling members 2 and 3 are formed on the free extremities of the grip members 4 and 5, are extended therefrom at an incline to said grip members and are transversely turned toward each other, their adjacent edges 6 having their upper corners rounded for gripping the stems of weeds between them, without cutting off said stems.

The hinge members 7 and 8 are of U shape, the central portions of which are secured on the hinged ends of the grip members 4 and 5, respectively. The edge portions of the member 7 overlap the edge portions of the member 8, which latter are oscillatably mounted on the hinge bolt 9, the ends of which bolt are secured in the edges of member 7, as seen in Fig. 3. The central portion of the U shaped spring 10 partially encircles said bolt with its ends pressing against the inner surfaces of the grip members 4 and 5, for moving the free ends of the latter and the therewith formed pulling member from each other. This outward movement of said parts is limited by contact of the corners 8′ of the hinge member 8, with the inner surface of the adjacent end of the grip member 4, seen best in Fig. 4.

Referring to Fig. 5, the upper, inner corners of the pulling members 2 and 3 are rounded at 2′, for preventing said corners from cutting the stems of weeds, and the outer edges of said pulling members are rounded for preventing mechanical injury thereby, to useful plants.

In operation of the weed puller, as shown in Figs. 1 and 2, the operator with one hand grasps the grip members 4 and 5 and thereby moves the pulling members 2 and 3 to such position, that they are flat upon the ground with the stem of the weed to be pulled between them. He then tightly grips said grip members, thereby overcoming the spring 10 and moving the free end portions of said grip members and the therewith formed pulling members toward each other, until the edges 6 of said pulling members tightly grip the stem of said weed between them. He then lifts the instrument, thereby pulling said weed, together with its roots from the ground.

Where the weeds are close together, a number of their stems are thus tightly gripped between said pulling edges and the entire number of weeds together with their roots is served as described.

Where the useful plants are close together the user of the instrument moves the pulling members toward each other sufficiently to enable him to pass the extremities of said members between said plants and astride such weed or weeds as may be there, after which the previously described weed pulling operations are repeated.

Where it is desired to use the described weed puller without stooping to the ground, the handles 11, (of light material, such as wood or bamboo,) of which only the end portions are shown, are detachably secured to the instrument, as seen in Figs. 3 and 4.

The lower ends of the handles 11 are tightly secured in the sockets 12, with which the rose-faced members 13 are formed.

The rose-faces of said members are tightly secured on the correspondingly formed rose-faces of the securing members 14, by the screws 15. The last mentioned members are secured on the grip members 4 and 5, as seen in Figs. 3 and 4, by passing their flanges 16 over the narrower portions of said grip members and thereafter driving said members and their flanges toward the wider portions of said grip members until said flanges are tightly fitted on the edges of said last mentioned members.

In operation of the weed puller, with the handles 11 attached as described, the operator so adjusts the rose-faced members 13, that the therewith connected handles are inclined to said grip members, at the angle he desires, after which he tightens the screws 15. He thereafter grasps the upper ends of said handles with one hand, and thereby performs the previously described weed pulling operations without stooping his body.

Having fully described my invention, what I claim as new and desire to secure by Letters Patent, is:

1. A weed puller comprising; a pair of grip members adapted to be gripped by the hand; a hinge member of U shape for each one of said grip members the central portions of said members being secured on the hinged ends of their respective grip members with their edges lapping past each other respectively; a hinge bolt whereby the edges of said hinge members are hinged together; a U shaped spring the central portion of which is mounted on said hinge bolt with the ends of said spring compressed against said grip members, for moving their free end portions from each other; rear corners formed on one of said hinge members said corners being moved by action of said spring, for contacting with the adjacent surface of the rear end of the opposed grip member thereby limiting the movement of its connected grip member.

2. In a weed puller, a pair of grip members hinged together for movement of said members toward and from each other; a weed pulling member formed on the free end of each one of said grip members; a spring for moving the free end portions of said grip members from each other; limiting means whereby said movement is limited; a pair of handles the lower ends of which are respectively connected with said grip members the upper ends of said handles being adapted to be gripped in the hand of a person for thereby moving said grip members toward each other; and adjusting means whereby the inclination of said handles to said grip members is adjusted.

In testimony whereof I affix my signature.

LUTHER VESTAL.